United States Patent
Lambert et al.

(10) Patent No.: US 11,625,214 B2
(45) Date of Patent: Apr. 11, 2023

(54) VARIABLE PERFORMANCE CODEC

(71) Applicant: Cirrus Logic International Semiconductor Ltd., Edinburgh (GB)

(72) Inventors: Bradley A. Lambert, Austin, TX (US); Michael A. Kost, Cedar Park, TX (US); Bruce E. Duewer, Round Rock, TX (US)

(73) Assignee: Cirrus Logic, Inc., Austin, TX (US)

( * ) Notice: Subject to any disclaimer, the term of this patent is extended or adjusted under 35 U.S.C. 154(b) by 153 days.

(21) Appl. No.: 16/200,917

(22) Filed: Nov. 27, 2018

(65) Prior Publication Data

US 2019/0163435 A1 May 30, 2019

Related U.S. Application Data

(60) Provisional application No. 62/591,970, filed on Nov. 29, 2017.

(51) Int. Cl.
*G06F 3/16* (2006.01)

(52) U.S. Cl.
CPC .................... *G06F 3/162* (2013.01)

(58) Field of Classification Search
CPC ....... G06F 3/162; G06F 3/165; G10L 19/167; G10L 19/22; G10L 19/002; G10L 19/008; H03M 1/66; H03M 1/12; H03M 1/46; H04R 2460/03

USPC ............... 381/119; 455/74; 700/94; 704/500, 704/501, 502, 503, 504

See application file for complete search history.

(56) References Cited

U.S. PATENT DOCUMENTS

| | | | |
|---|---|---|---|
| 7,751,913 B2 * | 7/2010 | Lin | G06F 1/3203 700/94 |
| 7,885,422 B2 * | 2/2011 | Sinai | H04M 1/6066 381/119 |
| 8,615,398 B2 * | 12/2013 | Sampat | G10L 19/22 704/500 |
| 9,735,799 B1 * | 8/2017 | Nguyen | H03M 1/06 |
| 2012/0155586 A1 * | 6/2012 | Felder | H03L 7/16 375/355 |
| 2015/0256925 A1 * | 9/2015 | Lesso | H03M 3/374 341/144 |
| 2015/0295584 A1 * | 10/2015 | Das | H03M 1/0845 341/154 |
| 2017/0245071 A1 | 8/2017 | Agarwal et al. | |

* cited by examiner

*Primary Examiner* — Fan S Tsang
*Assistant Examiner* — David Siegel
(74) *Attorney, Agent, or Firm* — Jackson Walker L.L.P.

(57) ABSTRACT

A system may include an audio coder-decoder (codec) having a plurality of digital-to-analog converters (DACs) and a plurality of analog-to-digital converters (ADCs), a serial interface communicatively coupled to the audio codec wherein the serial interface is configured to communicate audio streams to or from the audio codec, wherein the audio codec is configured to be configured as a device on the serial interface, and logic configured to control performance of a communication path within the audio codec based on one or more system conditions associated with the system.

26 Claims, 7 Drawing Sheets

VARIABLE PERFORMANCE CODEC

RELATED APPLICATION

The present disclosure claims priority to U.S. Provisional Patent Application Ser. No. 62/591,970, filed Nov. 29, 2017, which is incorporated by reference herein in its entirety.

FIELD OF DISCLOSURE

The present disclosure relates in general to circuits for electronic devices, including without limitation audio devices, including personal audio devices such as wireless telephones and media players, and more specifically, to systems and methods relating to a variable performance coder decoder (codec), including without limitation a variable performance Universal Serial Bus (USB) codec.

BACKGROUND

Universal Serial Bus ("USB") is a well-known industry communication protocol for electronic devices. USB provides a well-defined standard protocol that allows electronic devices to communicate with each other and to provide power delivery to them as well. Various versions of the USB protocol exist, such as USB 1.x, USB 2.0, USB 3.0, USB 3.1, USB-C.

In a typical USB system, digital audio can be transmitted from a host to a device (render) or from a device to a host (capture), or both. One or more audio channels may be present in the render or capture streams when they are active. Each digital audio channel may be configured to support the specific sample rate, with the preferred embodiment allowing sample rates of 8 kHz, 32 kHz, 44.1 kHz, 48 kHz, 96 kHz, 192 kHz, and 384 kHz. Additionally, each audio channel may be configured to support specific resolution for each audio sample with the preferred embodiment allowing resolutions of 16-bits per sample, 24-bits per sample, and 32-bits per sample.

FIG. 1 depicts selected components of a USB device, as is known in the art. FIG. 1 depicts a USB device, comprising a USB PHY, a USB controller, a microprocessor and memory block, a Serial Peripheral Interface ("SPI") block, an I2S block, and a digital-to-analog converter ("DAC"). The USB PHY and USB controller may combine to translate USB specification compliant signaling on the data plus/data minus (DP/DM) pins into audio and command data usable by the microprocessor and memory block. The microprocessor and memory block may translate the data communicated across the USB DP/DM pins to extract commands and digital audio data. In some instances, the combined USB PHY, USB Controller, and microprocessor and memory subsystem may comply with the USB 2.0 specification. The microprocessor and subsystem may send configuration and audio data to the DAC via a bus system, nominally Advanced High-performance Bus (AHB), Advanced Peripheral Bus (APB), or other suitable bus. The DAC may transform digital audio data into an analog waveform.

FIG. 2 depicts selected components of a USB device having an external DAC (as opposed to an internal DAC as shown in FIG. 1), as is known in the art. In such a USB device, audio data may be communicated over a serial audio interface, shown as Integrated Inter-IC Sound Bus (I2S), to an external DAC. A serial control interface, shown as Serial Peripheral Interface (SPI), may be used to send command and configuration information to the external DAC.

In these known systems, typically one DAC is selected. Selection of the single DAC may involve a set of trade-offs between power and performance. If a high performance DAC is selected, it may consume a large amount of power. If a low performance DAC is selected, a USB Host may request to send digital audio data over a wide range of performance levels. 16-bit, 8 kHz audio data is very low performance compared to 32-bit, 384 kHz audio data. Preferably, high power would not be consumed when playing back 16-bit, 8 kHz audio. Equally, a low-power DAC would not be of sufficient performance to take advantage of the 32-bit, 384 kHz audio quality.

SUMMARY

In accordance with the teachings of the present disclosure, one or more disadvantages and problems associated with existing approaches for processing in a codec may be reduced or eliminated.

In accordance with embodiments of the present disclosure, a system may include an audio coder-decoder (codec) having a plurality of digital-to-analog converters (DACs) and a plurality of analog-to-digital converters (ADCs), a serial interface communicatively coupled to the audio codec wherein the serial interface is configured to communicate audio streams to or from the audio codec, wherein the audio codec is configured to be configured as a device on the serial interface, and logic configured to control performance of a communication path within the audio codec based on one or more system conditions associated with the system.

In accordance with these and other embodiments of the present disclosure, a method may be provided for use in a system comprising an audio coder-decoder (codec) having a plurality of digital-to-analog converters (DACs) and a plurality of analog-to-digital converters (ADCs) and a serial interface communicatively coupled to the audio codec wherein the serial interface is configured to communicate audio streams to or from the audio codec, wherein the audio codec is configured to be configured as a device on the serial interface. The method may include controlling performance of a communication path within the audio codec based on one or more system conditions associated with the system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
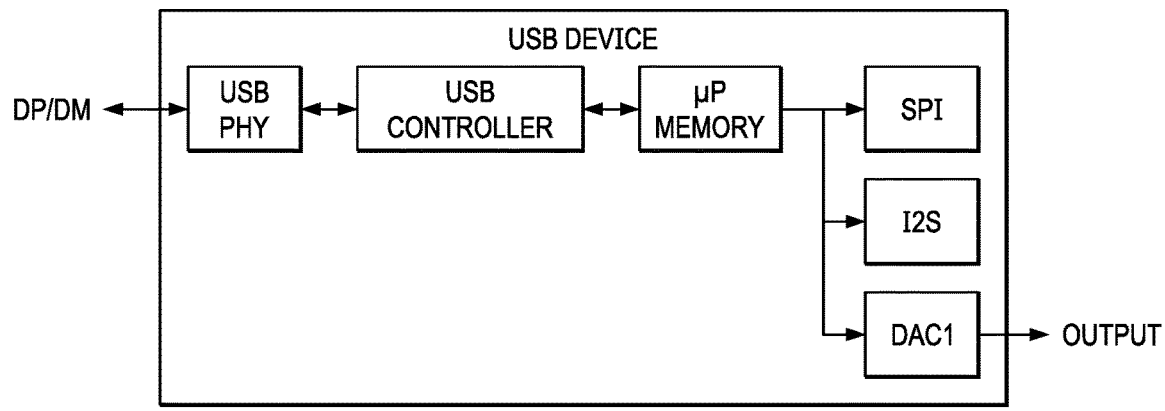
FIG. 1 depicts selected components of a USB device having an internal DAC, as is known in the art.
Figure 2:
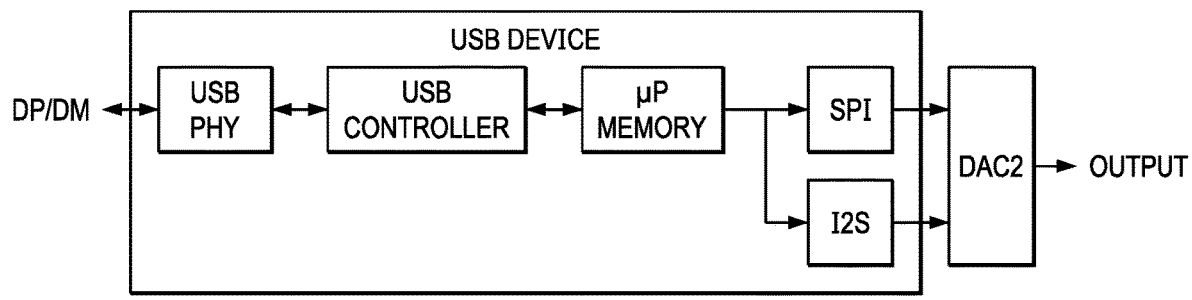
FIG. 2 depicts selected components of a USB device having an external DAC, as is known in the art.
Figure 3:
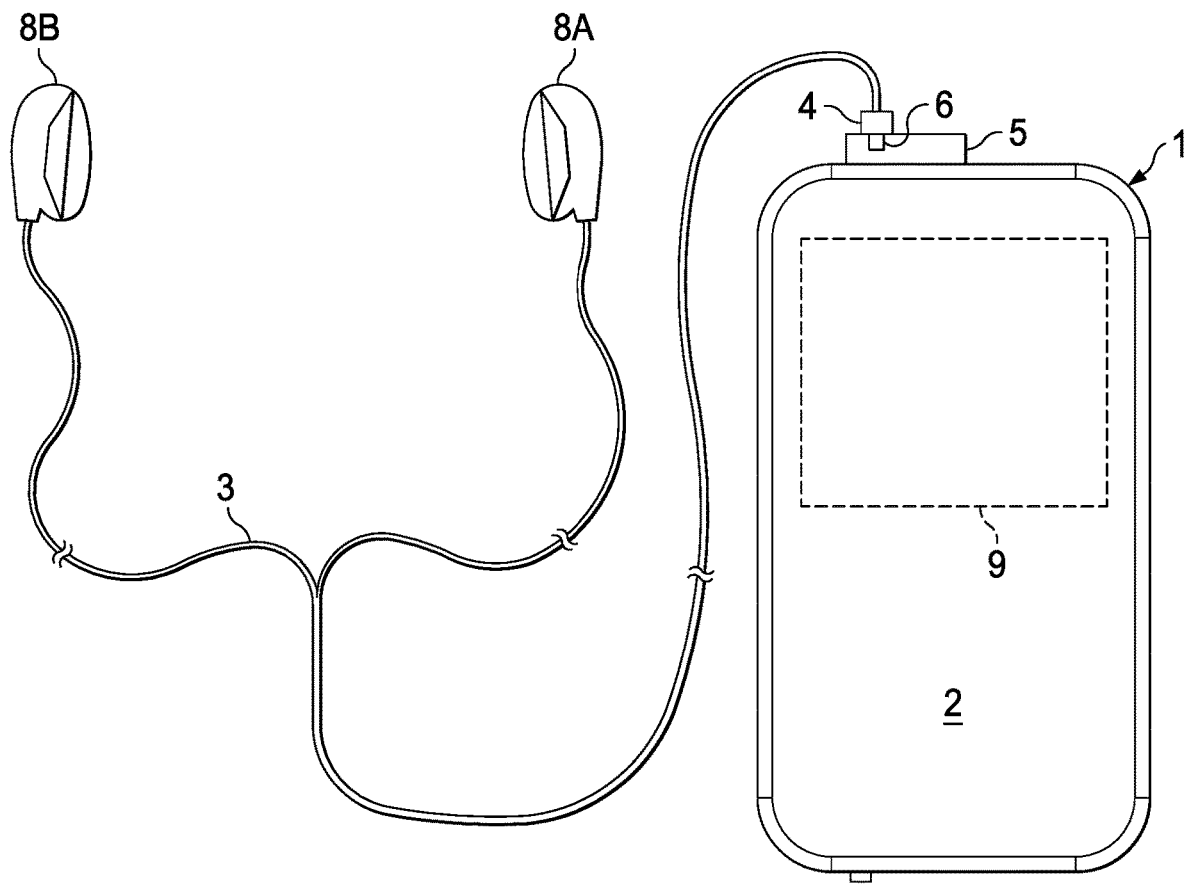
FIG. 3 illustrates an example personal audio device, in accordance with embodiments of the present disclosure.

FIG. 3 illustrates an example personal audio device 1, in accordance with embodiments of the present disclosure. Personal audio device 1 as depicted in FIG. 3 represents one of many types of devices that may operate as a host for communication over a communication protocol bus, such as USB for example. For instance, notebook computers, laptop computers, tablet computers, and desktop computers may also be examples of devices that may operate as a host for coupling to a device for purposes of this disclosure.

As shown in FIG. 3, personal audio device 1 may have coupled thereto a device 5, such as a USB device or adapter, for example. Device 5 may include a port 6 which serves as an electrical terminal for receiving one or more other peripheral devices, such that device 5 may serve as an interface between such one or more peripheral devices and personal audio device 1. As a non-limiting example, FIG. 3 depicts a headset 3 in the form of a pair of earbud speakers 8A and 8B, wherein headset 3 is coupled to personal audio device 1 via device 5. Headset 3 depicted in FIG. 3 is merely an example of a peripheral device, and it is understood that personal audio device 1 or any other suitable host may be used in connection with a variety of peripheral devices, including other audio devices (e.g., headphones, earbuds, in-ear earphones, and external speakers) or non-audio devices (optical devices, storage media, etc.). A plug 4 may provide for connection of headset 3 to port 6 of device 5. Personal audio device 1 may provide a display to a user and receive user input using a touch screen 2, or alternatively, a standard liquid crystal display (LCD) may be combined with various buttons, sliders, and/or dials disposed on the face and/or sides of personal audio device 1. As also shown in FIG. 3, personal audio device 1 may include a processor 9 for controlling operation of personal audio device 1, and device 5 and headset 3 coupled thereto. As described in greater detail below, processor 9 may include or otherwise implement a plug-and-play device controller for managing device 5 and peripheral devices coupled thereto.

Figure 4:
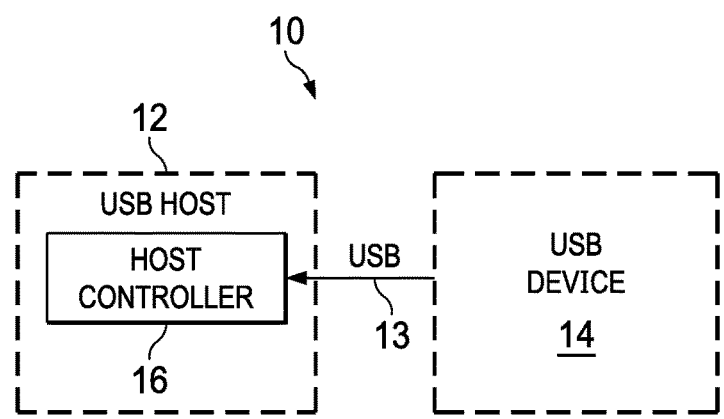
FIG. 4 illustrates a block diagram of an example system having a USB host and a USB device coupled via a USB bus, in accordance with embodiments of the present disclosure.

FIG. 4 illustrates a block diagram of example system 10 having a USB host 12 and a USB device 14 coupled via a USB communication interface 13, in accordance with embodiments of the present disclosure. USB host 12 may be any suitable host device, including without limitation personal audio device 1 depicted in FIG. 3. As shown in FIG. 3, USB host 12 may include, among other components, a host controller 16, as is known in the art. Host controllers and their functionality for providing an interface between a host system and other devices are well-known in the art. USB device 14 may be any suitable peripheral device, including without limitation device 5 depicted in FIG. 3. Example embodiments of USB device 14 are described below with reference to FIGS. 6-9.

Because a host (e.g., USB host 12) must often communicate the audio quality as part of the USB protocol, it may be possible to determine the required level of performance based on the audio quality. Thus, a system that scales power consumption with the audio quality received may be desired.

Figure 5:
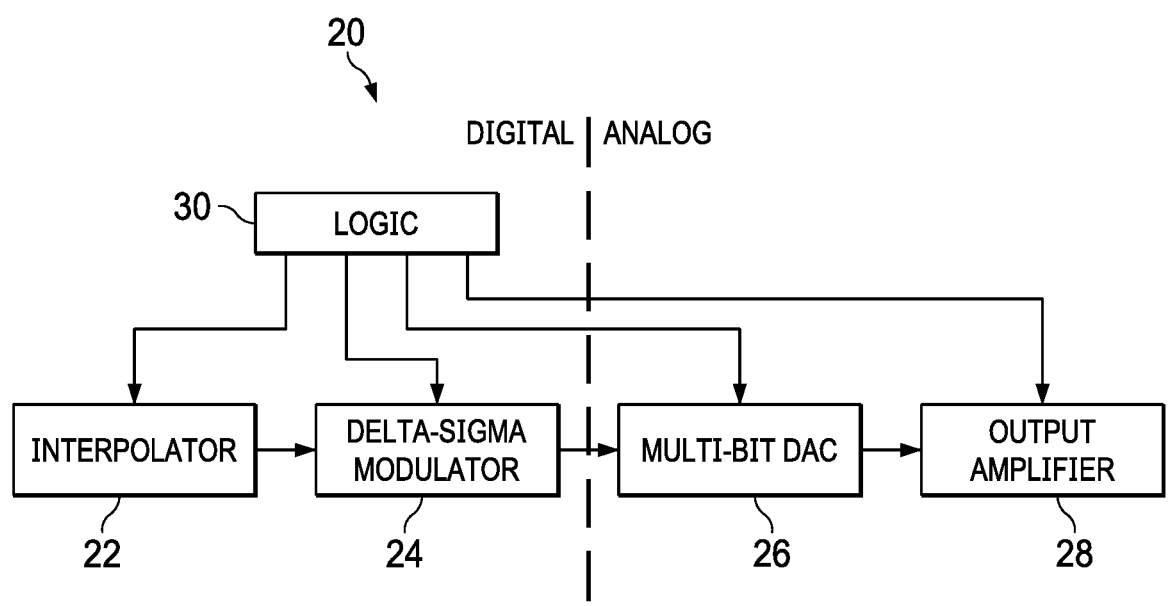
FIG. 5 illustrates selected components of an example DAC, in accordance with embodiments of the present disclosure.

FIG. 5 illustrates selected components of an example DAC 20, in accordance with embodiments of the present disclosure. Although any appropriate DAC architecture may be used to implement a DAC in accordance with the present disclosure, FIG. 5 depicts DAC 20 implemented as a delta-sigma DAC. In operation, an interpolator block 22 may receive incoming digital audio data (e.g., typically at a sample rate between 8 kHz and 384 kHz) and may increase the sample rate to a final oversampled delta-sigma word rate (e.g., typically 3 MHz). A delta-sigma modulator 24 may reduce an output bit width of the input sample size (e.g., typically 24 bits to 32 bits), and may reduce the bit width (e.g., to four bits), using noise shaping techniques. A multi-bit DAC 26 may convert the low bit-width digital word into an analog signal. An output amplifier 28 may provide some level of low-pass filtering of the delta-sigma word-rate signals and may buffer an output for driving loads (e.g., to a speaker or other transducer). DAC systems are known to those skilled in the art. For example, a description of such a system may be found in U.S. Ser. No. 15/050,139 entitled "Direct Current (DC) and/or Alternating Current (AC) Load Detection for Audio Codec" filed on Feb. 22, 2016, which is incorporated herein by reference. In such system, if audio is of low quality, logic 30 (which may be internal or external to DAC 20 and/or embodied in a processor such as in processor and memory 36 depicted in FIGS. 6-9 below) may cause system performance reductions to be undertaken to DAC 20 to save power. Examples of such system performance reductions may include:

Reduction of the delta-sigma word rate, for example from 3 MHz to 1.5 MHz, may reduce power in interpolator 22 and delta-sigma modulator 24.

Additionally, bias currents in multi-bit DAC 26 and/or the output amplifier 28 may be reduced because more settling time is available.

A performance and/or a bit-width of interpolator 22 and the input to delta-sigma modulator 24 may be reduced if a lower input audio word bit width is used by an audio system.

If a lower sample rate is used in an audio system, an order of a noise shaper of delta-sigma modulator noise shaper 24 may be reduced and alternate noise shaper coefficients may be used.

Figure 6:
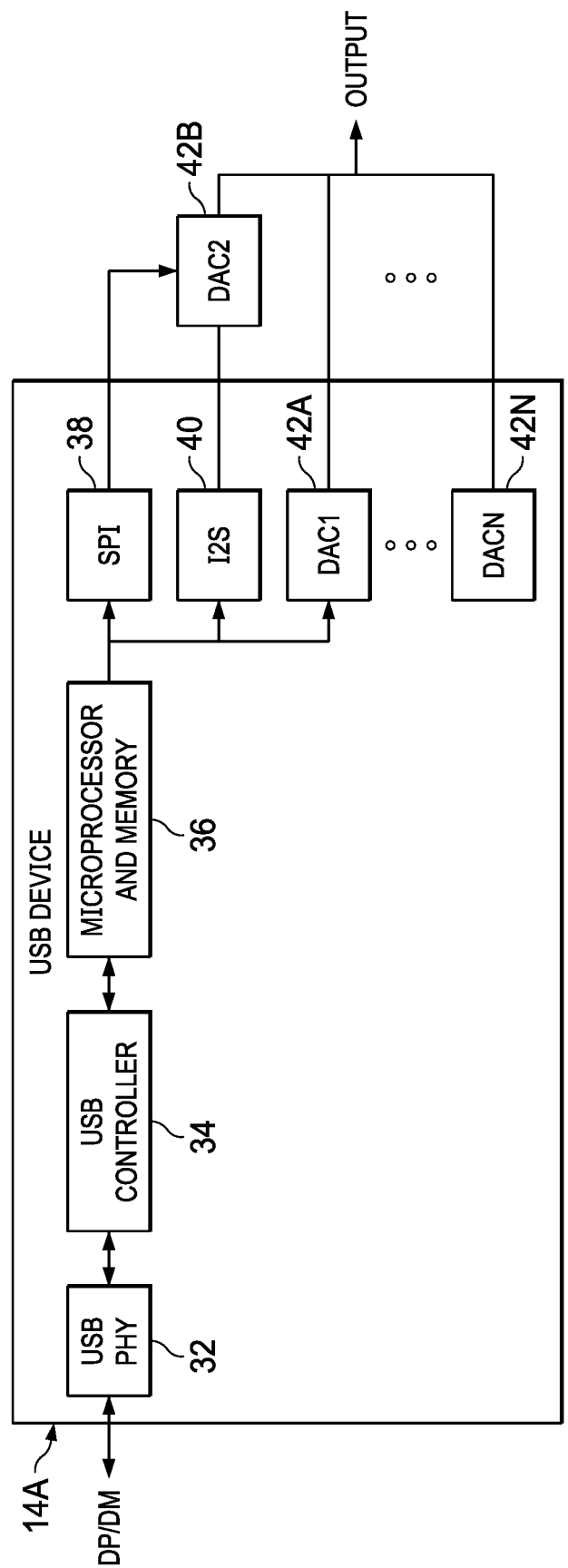
FIG. 6 illustrates selected components of an example device, in accordance with embodiments of the present disclosure.

FIG. 6 illustrates selected components of an example USB device 14A, in accordance with embodiments of the present disclosure. In some embodiments, example USB device 14A may implement device 14 shown in FIG. 4. As shown in FIG. 6, USB device 14A may include a USB PHY 32, a USB controller 34, a microprocessor and memory subsystem 36, SPI 38, and I2S interface 40 arranged as shown, similar to that described in the background section of this application. Furthermore, as shown in FIG. 6, USB device 14A may include a plurality of DACs 42 present in the system, enumerated as DAC1 42A to DACN 42N. Each DAC 42 may be configured for a different level of performance and power as compared to other DACs 42. In USB device 14A, microprocessor and memory subsystem 36 may, based on an audio quality of a host-communicated audio stream, determine which of the plurality of DACs 42 to power up for converting digital audio data to equivalent analog waveforms. In some embodiments, logic (e.g., embodied in microprocessor and memory subsystem 36) may control a plurality switches that tristate the respective outputs (not shown) of each DAC output (not shown) in order to prevent coupling from inactive DACs 42 on an active path of a selected active DAC 42. Those of skill in the art may recognize that many ways exist to implement a high-impedance output from each of DACs 42 which may be DAC implementation specific. In some embodiments, at least one of the plurality of DACs 42 (e.g., DAC2 42B as shown in FIG. 6) may be on a discrete semiconductor die external to a semiconductor die implementing USB device 14A.

Although the foregoing contemplates use of serial interfaces including USB, and I2S, the teachings of this disclosure may also apply to use with other serial interfaces, including without limitation Lightning interface and Soundwire interface, While the foregoing has completed the use of audio quality characteristics, such as sample rate or sample resolution, a plurality of settings or criteria may be used to determine an allowable power consumption in a DAC configuration. Such settings or criteria may include:

Overall stream bandwidth, which may be characterized as a product of a sample rate and a sample resolution of the digital audio stream.

Audio format: USB devices may receive compressed audio in formats like MP3 (e.g., MPEG-1 or MPEG-2 Audio Layer III), Advanced Audio Coding ("AAC"), Free Lossless Audio Codec ("FLAC"), or similar formats that have reduced audio quality compared to Pulse-Code Modulation ("PCM") audio data. The audio format and/or bit rate of the compressed audio may be used in determining a desirable DAC audio quality.

USB link power state: In high speed (480 Mbit/s) USB communication, the use of L1 burst modes as defined by the industry's Link Power Management (LPM) working group may indicate a desire to decrease power consumption in an end device. A device use state like L0, combined L0/L1 bursting, and L2 modes and settings in these modes like the USB Interval setting may indicate a desire for reduced power consumption.

Sideband signaling: a host (e.g., host 12) may hint or directly command the change of performance using a sideband signal communicated to USB device 14A. This signal may be transmitted via a USB interrupt endpoint or a separate interface. Examples of such interfaces may include USB Power Delivery ("USB PD"), SPI, or I2C, or a General-Purpose Input/Output ("GPIO") signal. In some embodiments, the GPIO signal may be triggered by a mechanical button press or human interaction with a mechanical button replacement.

Audio quality: characteristics of audio data may be analyzed to determine whether a particular audio performance is necessary. For example, 24-bit data may include noise well above a theoretical noise floor and not require high performance. This need may be determined by local signal processing or by analysis of the audio stream. Local signal processing may include acoustic noise cancellation algorithms.

Figure 7:
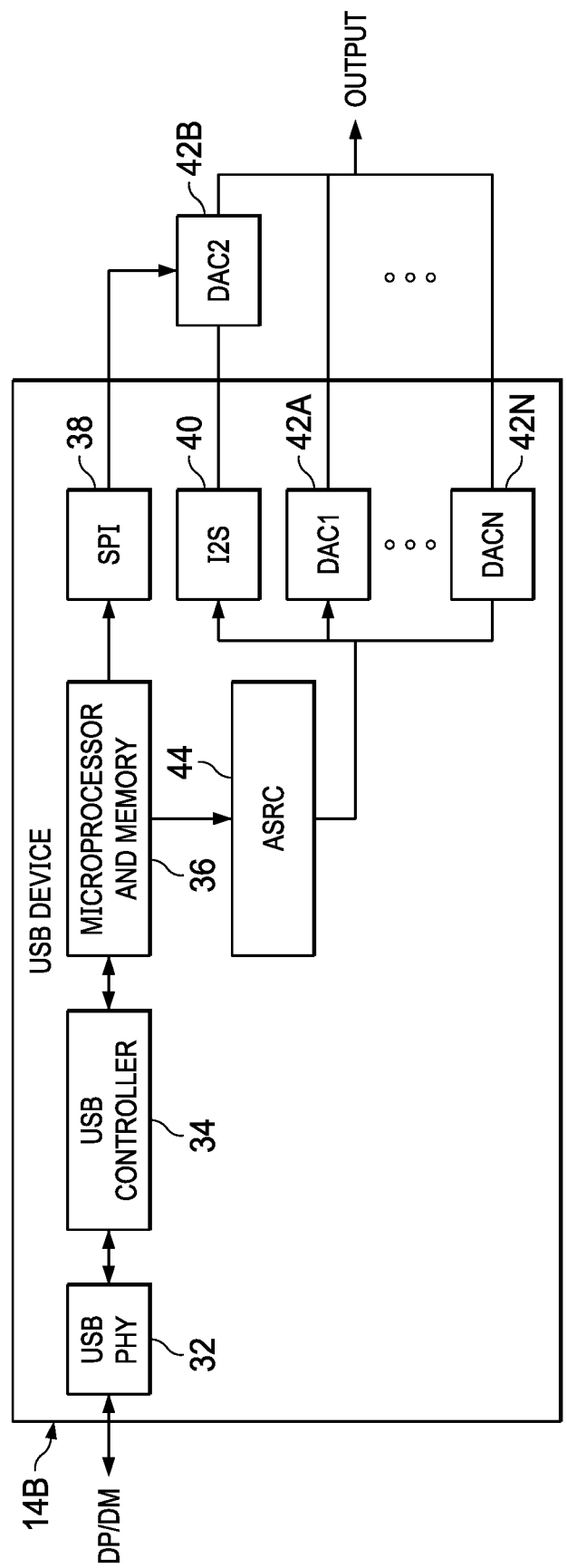
FIG. 7 illustrates selected components of an example device including an asynchronous rate converter, in accordance with embodiments of the present disclosure.

FIG. 7 illustrates selected components of an example USB device 14B, in accordance with embodiments of the present disclosure. In some embodiments, example USB device 14B may implement device 14 shown in FIG. 4. USB device 14B of FIG. 7 may be similar in many respects to USB device 14A of FIG. 6. However, one difference between USB device 14A and USB device 14B is that USB device 14B may include an asynchronous sample rate converter (ASRC) 44 interfaced between microprocessor and memory subsystem 36 on one hand and I2S 40 and at least one of the plurality of DACs 42 on the other hand. ASRC 44 may be used to convert a digital audio stream at a USB audio sample rate to a different, internal audio sample rate. Thus, in USB device 14B, control logic (e.g., embodied within microprocessor and memory subsystem 36) may vary one or more operating characteristics of ASRC 44. Some examples of such one or more operating characteristics may include:

Input and output sample rate of ASRC 44: For higher performance scenarios, an output sample rate of ASRC 44 may run a higher sample rate to allow higher bandwidth audio to process. For example, if USB audio was 192 kHz but low power was preferred, logic may reduce the output sample rate of ASRC to 48 kHz.

For some ASRC architectures, doing a conversion from very close rates (i.e., 48.00 kHz to 48.01 kHz), referred to as near-rate conversions, results in degraded performance. Low power and lower performance systems may allow near-rate conversions while high performance systems may change the output sample rate of ASRC 44 to avoid near rate conversions by, for example, converting from 48 kHz to 96 kHz.

Figure 8:
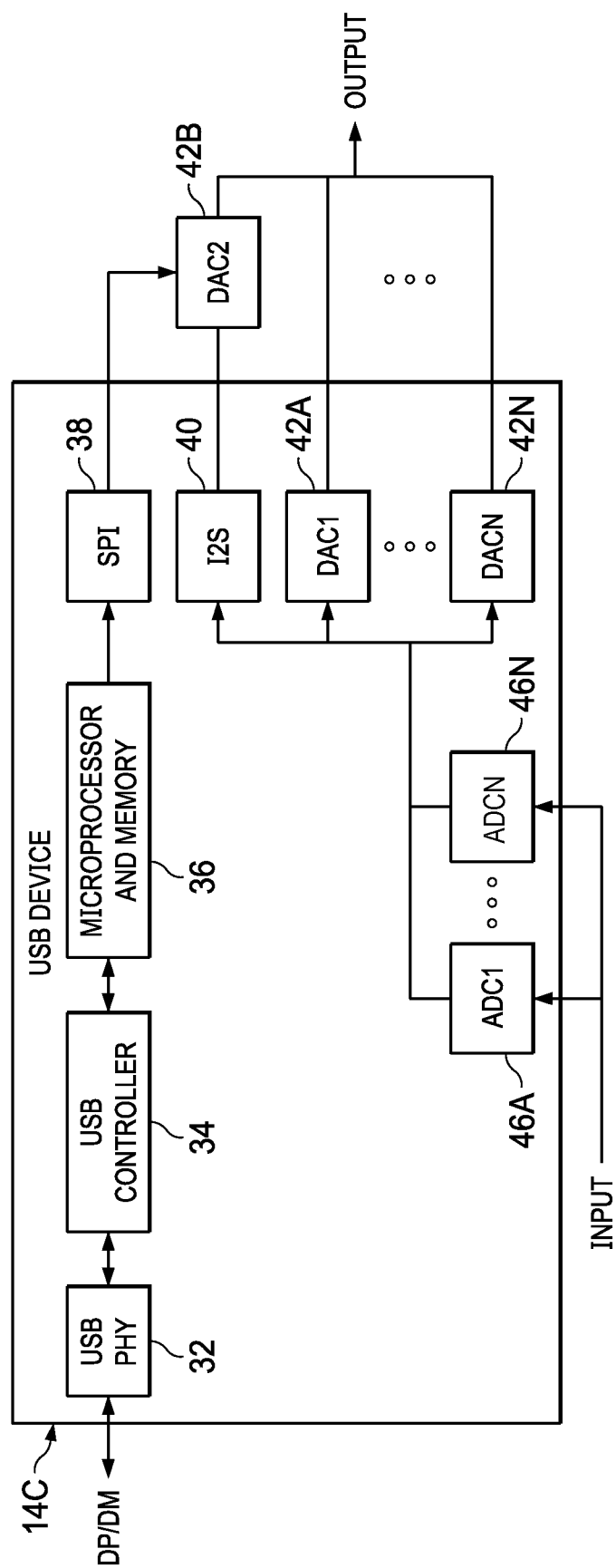
FIG. 8 illustrates selected components of an example device including a plurality of analog-to-digital converters, in accordance with embodiments of the present disclosure.

Methods and approaches similar to those described above may be applied for devices that include analog-to-digital converters (ADCs) instead of or in addition to DACs. FIG. 8 illustrates selected components of an example USB device 14C, in accordance with embodiments of the present disclosure. In some embodiments, example USB device 14C may implement device 14 shown in FIG. 4. USB device 14C of FIG. 8 may be similar in many respects to USB device 14A of FIG. 6. However, one difference between USB device 14A and USB device 14C is that USB device 14C may include a plurality of ADCs 46 (e.g., ADC1 46A to ADCN 46N) for receiving analog signals. In operation, each ADC 46 may be configured to capture an analog input signal, digitize such signal into an equivalent digital signal using a DAC 42, and transmit the digital signal back to a host (e.g., host 12) at a sample rate and bit width requested by the host. In operation, logic (e.g., embodied in microprocessor and memory subsystem 36) may select from a plurality of internal DACs 42, external DACs 42, internal ADCs 46, external ADCs (not explicitly shown in FIG. 8), and ASRCs (such as ASRC 44 of FIG. 7).

In a device including multiple ADCs such as that shown in USB device 14C of FIG. 8, additional criteria for determining an allowable power consumption may also include criteria related to voice activity or voice keyword detection. For example, if an ADC signal associated with an ADC 46 is received directly or indirectly from a microphone, a voice activity detection or keyword detection algorithm may be used on a low quality signal to indicate that higher audio performance may be needed.

In addition or alternatively, in systems comprising multi-path ADCs, such as those taught in U.S. Pat. Nos. 9,525,940; 9,148,164; 9,071,268; 9,071,267; and U.S. Ser. No. 14/596, 826 entitled "Multi-Path Analog Front End and Analog-to-Digital Converter for a Signal Processing System" filed on Jan. 14, 2015 (all of which are incorporated by reference), ADC construction may include multiple discrete ADCs 46. Logic (e.g., embodied in microprocessor and memory subsystem 36) may control such ADCs in a manner to disable ADCs with a higher gain over ADCs with lower gain in lower power configurations.

Figure 9:
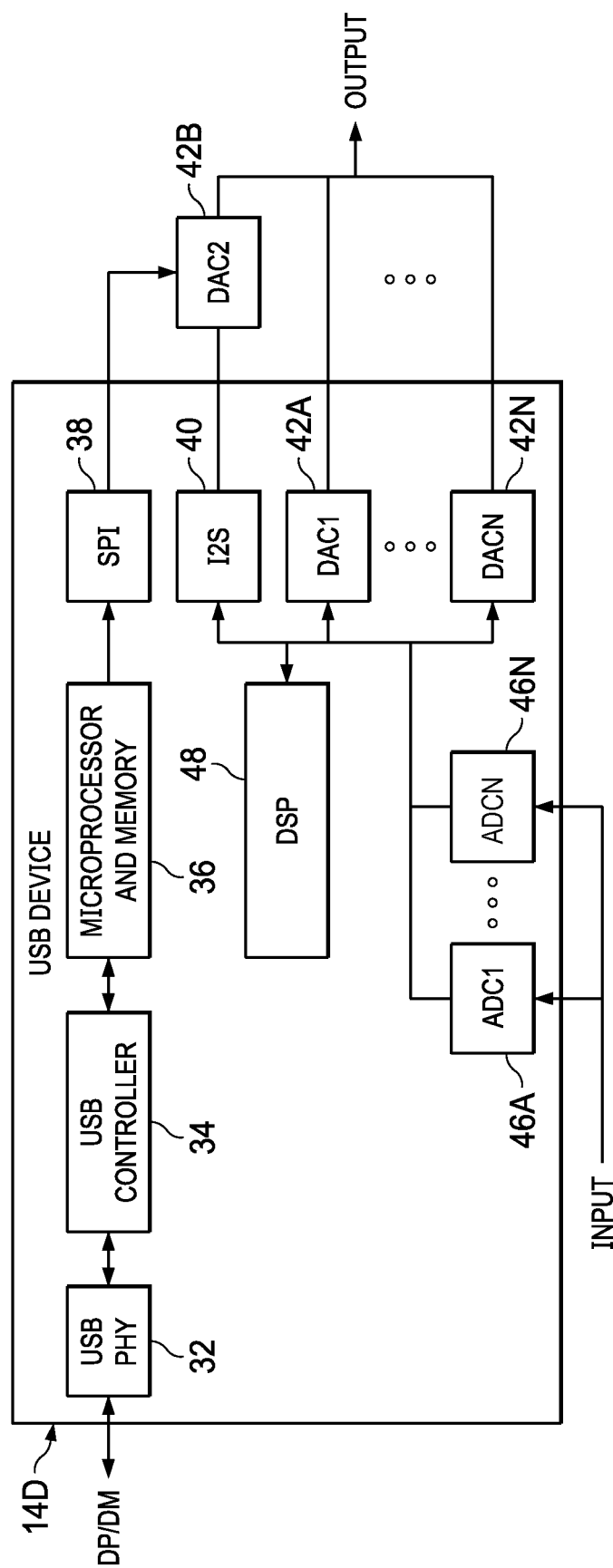
FIG. 9 illustrates selected components of an example device including a digital signal processor, in accordance with embodiments of the present disclosure.

FIG. 9 illustrates selected components of an example USB device 14D, in accordance with embodiments of the present disclosure. In some embodiments, example USB device 14D may implement device 14 shown in FIG. 4. USB device 14D of FIG. 9 may be similar in many respects to USB device 14C of FIG. 8. However, one difference between USB device 14C and USB device 14D is that USB device 14D may include a digital signal processor (DSP) 48 for processing digital audio data. In a device such as USB device 14D, logic (e.g., embodied in microprocessor and memory subsystem 36) may use the following additional criteria to determine a desired power consumption and desired performance configuration:

Audio mixing: if audio mixing is applied to an ADC or DAC signal path that reduces the effective signal-to-noise ratio or dynamic range of a digital audio signal or increases magnitude of total harmonic distortion, logic may configure USB device 14D for lower power consumption. Examples of such audio mixing may include:

An adaptive noise cancellation system, such as the one disclosed in U.S. Pat. No. 9,142,207 entitled "Oversight Control of an Adaptive Noise Canceler in a Personal Audio Device" (which is incorporated by reference in its entirety) in which ADC signals from microphones are mixed into a DAC path.

Side tone mixing on phone calls in which voice microphone data from an ADC is mixed into a DAC playback stream.

Audio processing algorithms: algorithms like beam forming and echo cancellation may alter the characteristics of the audio signal and reduce the required performance.

Load detection: the level of power/performance may be modified in response to the impedance of the load on the output.

Ambient noise: a detector on the ambient noise (e.g., observed via a microphone on an ADC input) may identify when high dynamic range is not necessary because of high ambient noise.

In systems and methods described above, when criteria for changing an audio power and performance configuration exists, logic may temporally control when such change occurs in one or more of the following manners:

Change immediately: logic updates a power and performance configuration is immediately based on criteria being met.

Change at updated sample rate or sample resolution: logic updates a power and performance configuration when a USB host configures the sample rate and sample resolution. For example, in USB Audio Class 1.0 the sample rate support may be defined by an Alternate Setting (as defined by the USB specification) selected by the host. In USB Audio Class 2.0 and 3.0, the sample rate may be determined by a host setting the Clock Frequency Control in the Clock Source entity (as defined by the USB specification).

Wait for silence: logic may observe the audio stream to monitor for silence or near silence (e.g., a signal below a threshold) and update a power and performance configuration when such condition is met.

Wait for host to set Alternate SettingZero: logic may update a power and performance configuration when an audio streaming interface Alternate SettingZero (as defined by the USB specification) is enabled.

Change on algorithm change: if the processing algorithm in the DSP is altered, modified, or switched, logic may update a power and performance configuration in response to the new algorithm configuration.

Change on user prompt: logic may update the power/performance configuration based on input from the user (e.g., a button press or processing of a user initiated human interface device ("HID") event).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:
   an audio coder-decoder (codec) having a plurality of digital-to-analog converters (DACs);
   a serial interface communicatively coupled to the audio codec wherein the serial interface is configured to communicate audio streams to or from the audio codec, wherein the audio codec is configured to be configured as a device on the serial interface; and
   logic configured to control performance of a communication path within the audio codec based on one or more system conditions associated with the system by:
   responsive to a quality of a received audio stream being below a threshold quality, reduction of power consumption of the communication path to minimize power consumption; and
   at least one of: reduction of a delta-sigma word rate associated with the communication path and reduction of a bit width associated with the communication path.

2. The system of claim 1, wherein the serial interface is one of an Inter-Integrated Sound (I2S) interface, Universal Serial Bus (USB) interface, Lightning interface, and a Soundwire interface.

3. The system of claim 1, wherein the logic is configured to control performance of the communication path to minimize power consumption of the system.

4. The system of claim 1, wherein the logic is configured to control performance of the communication path to maximize an audio quality of the system.

5. The system of claim 4, wherein the audio quality comprises a total harmonic distortion and noise quality.

6. The system of claim 4, wherein the audio quality comprises one of a dynamic range ratio and a signal-to-noise ratio of the system.

7. The system of claim 1, wherein the logic reduces power by causing one or more of: reduction of power consumption of an interpolator of the communication path, reduction of power consumption of a delta-sigma modulator of the communication path, reduction of a bias current of a multi-bit DAC, reduction of a bias current of an output amplifier of the communication path, reduction of audio quality associated with an interpolator of the communication path, and reduction of audio quality associated with a delta-sigma modulator of the communication path.

8. The system of claim 1, wherein:
   each DAC among the plurality of DACs has a respective level of audio performance and a respective level of power consumption; and
   the logic is configured to control performance of the communication path by selecting which DAC from the plurality of DACs to power on for performing digital-to-analog conversion in the communication path.

9. The system of claim 1, further comprising an asynchronous sample rate converter (ASRC) configured to convert an audio signal of the communication path at one sampling frequency to an audio signal at another sampling frequency.

10. The system of claim 9, wherein the logic causes at least one of a power consumption and an audio performance of the ASRC to vary based on an input sample rate and an output sample rate associated with the communication path.

11. The system of claim 1, wherein the system conditions comprise one or more of the following: audio quality, stream bandwidth, audio format, communication protocol link power state, sideband signaling, input sample rate of an audio stream, output sample rate of an audio stream, voice activity, keyword detection, audio mixing, audio processing algorithms, load characteristics, and ambient noise.

12. The system of claim 1, wherein the logic is further configured to modify operational parameters in order to control performance of the communication path at one of the following times: immediately upon a change to one or more system conditions, when audio silence occurs, and when a host device sets an alternate setting of zero bandwidth.

13. The system of claim 1, wherein the codec further comprises a plurality of analog-to-digital converters (ADCs) and wherein the system further comprises a digital signal processor (DSP) coupled in series with at least one ADC of the plurality of ADCs and coupled in series with at least one DAC of the plurality of DACs, wherein:
   one or more digital audio streams originate from an input source of the system and are processed and output by the system; and
   one of the one or more digital audio streams is converted from or to an analog signal domain.

14. A method for use in a system comprising an audio coder-decoder (codec) having a plurality of digital-to-analog converters (DACs) and a serial interface communicatively coupled to the audio codec wherein the serial interface is configured to communicate audio streams to or from the audio codec, wherein the audio codec is configured to be configured as a device on the serial interface, the method comprising:
   controlling performance of a communication path within the audio codec based on one or more system conditions associated with the system:
   responsive to a quality of a received audio stream being below a threshold quality, reduction of power consumption of the communication path to minimize power consumption; and
   at least one of: reduction of a delta-sigma word rate associated with the communication path and reduction of a bit width associated with the communication path.

15. The method of claim 14, wherein the serial interface is one of an Inter-Integrated Sound (I2S) interface, Universal Serial Bus (USB) interface, Lightning interface, and a Soundwire interface.

16. The method of claim 14, wherein controlling performance of the communication path minimizes power consumption of the system.

17. The method of claim 14, wherein controlling performance of the communication path maximizes an audio quality of the system.

18. The method of claim 17, wherein the audio quality comprises a total harmonic distortion and noise quality.

19. The method of claim 17, wherein the audio quality comprises one of a dynamic range ratio and a signal-to-noise ratio of the system.

20. The method of claim 14, further comprising reducing power by causing one or more of: reduction of power consumption of an interpolator of the communication path, reduction of power consumption of a delta-sigma modulator of the communication path, reduction of a bias current of a multi-bit DAC, reduction of a bias current of an output amplifier of the communication path, reduction of audio quality associated with an interpolator of the communication path, and reduction of audio quality associated with a delta-sigma modulator of the communication path.

21. The method of claim 14, wherein:
   each DAC among the plurality of DACs has a respective level of audio performance and a respective level of power consumption; and
   controlling performance of the communication path comprises selecting which DAC from the plurality of DACs to power on for performing digital-to-analog conversion in the communication path.

22. The method of claim 14, further comprising converting an audio signal of the communication path at one sampling frequency to an audio signal at another sampling frequency with an asynchronous sample rate converter (ASRC).

23. The method of claim 22, further comprising varying at least one of a power consumption and an audio performance of the ASRC based on an input sample rate and an output sample rate associated with the communication path.

24. The method of claim 14, wherein the system conditions comprise one or more of the following: audio quality, stream bandwidth, audio format, communication protocol link power state, sideband signaling, input sample rate of an audio stream, output sample rate of an audio stream, voice activity, keyword detection, audio mixing, audio processing algorithms, load characteristics, and ambient noise.

25. The method of claim 14, further comprising modifying operational parameters in order to control performance of the communication path at one of the following times: immediately upon a change to one or more system conditions, when audio silence occurs, and when a host device sets an alternate setting of zero bandwidth.

26. The method of claim 14, wherein the system further comprises a digital signal processor (DSP) coupled in series with at least one analog-to-digital converter (ADC) of a plurality of ADCs integral to the codec and coupled in series with at least one DAC of the plurality of DACs, wherein:
   one or more digital audio streams originate from an input source of the system and are processed and output by the system; and
   one of the one or more digital audio streams is converted from or to an analog signal domain.

* * * * *

UNITED STATES PATENT AND TRADEMARK OFFICE
CERTIFICATE OF CORRECTION

| | |
|---|---|
| PATENT NO. | : 11,625,214 B2 |
| APPLICATION NO. | : 16/200917 |
| DATED | : April 11, 2023 |
| INVENTOR(S) | : Lambert et al. |

It is certified that error appears in the above-identified patent and that said Letters Patent is hereby corrected as shown below:

In the Claims

1. In Column 9, Line 31, in Claim 2, delete "Inter-Integrated Sound (I2S)" and insert -- Integrated Inter-IC Sound Bus (I2S) --, therefor.

2. In Column 10, Line 39, in Claim 14, delete "system:" and insert -- system by: --, therefor.

3. In Column 10, Line 48, in Claim 15, delete "Inter-Integrated Sound (I2S)" and insert -- Integrated Inter-IC Sound Bus (I2S) --, therefor.

Signed and Sealed this
First Day of August, 2023

Katherine Kelly Vidal
*Director of the United States Patent and Trademark Office*